US008298086B2

(12) United States Patent
O'Connor et al.

(10) Patent No.: US 8,298,086 B2
(45) Date of Patent: Oct. 30, 2012

(54) PROVISION OF CONTACT CENTER SERVICES TO PLAYERS OF GAMES

(75) Inventors: Neil O'Connor, Lackagh (IE); Michael Hartman, Kilcolgan (IE)

(73) Assignee: Avaya Inc., Basking Ridge, NJ (US)

(\*) Notice: Subject to any disclaimer, the term of this patent is extended or adjusted under 35 U.S.C. 154(b) by 1726 days.

(21) Appl. No.: 11/608,475

(22) Filed: Dec. 8, 2006

(65) Prior Publication Data
US 2008/0139315 A1    Jun. 12, 2008

(51) Int. Cl.
*A63F 13/00*     (2006.01)

(52) U.S. Cl. ............................................ 463/42

(58) Field of Classification Search ............... 463/42
See application file for complete search history.

(56) References Cited

OTHER PUBLICATIONS

Wow Wiki article, retrieved Jul. 19, 2006.\*
World of Warcraft Manual.\*
Wow Wiki article, retrieved Nov. 18, 2011.\*

\* cited by examiner

*Primary Examiner* — Melba Bumgarner
*Assistant Examiner* — Thomas H Henry
(74) *Attorney, Agent, or Firm* — Barnes & Thornburg LLP (57) ABSTRACT

A mechanism is provided in a networked multiplayer game for use by playable characters. When operated by a player's character, this mechanism causes the game to send a request for contact to an external contact center. The contact request is queued and allocated to an agent, optionally with the assistance of information provided by the game. When a contact center agent answers the contact request, a communications channel is opened from the agent directly into the game where the game system directs the communication to the local environment of the player's character enabling the player to communicate with the agent of a contact center without leaving the game environment. The agent or contact center may additionally have a representation in the game so that the player can interact with the agent or contact center. The agent representation may be a character in the game controlled by an agent who is logged into the game, or by the contact center manipulating a game client or API, or by the game engine itself. A representation of the contact center may be a telephone graphic, portal, door, sign, lever, button or any other manipulable game object, and optionally a multimedia representation of the contact queuing system. Payments can be made to or from the player using in-game currency which is credited or debited to an account held by the contact center.

6 Claims, 4 Drawing Sheets

PROVISION OF CONTACT CENTER SERVICES TO PLAYERS OF GAMES

TECHNICAL FIELD

This invention relates to the provision of contact center services to the players of networked games, and to the facilitation of financial transactions by such players when dealing with contact centers.

BACKGROUND ART

Networked multiplayer games are known by a variety of different acronyms from the earliest MUDs (multi-user domains or dungeons), to the current variety of MMOGs (massively multiplayer online games), the most popular genres of which include MMORPG (massively multiplayer online role playing game), MMORTS (massively multiplayer online real time strategy) and MMOFPS (massively multi-player online first-person shooter).

These games, which are all networked multiplayer games, may be referred to herein for convenience as MMOGs, without any intended or implied limitation as to the number of players or the objectives, characteristics or nature of any such game, other than the fact that it is played over a network and involves multiple players.

A typical MMOG will employ the Internet as its network and will support several hundred or several thousand players. These players will frequently interact with one another and with the game environment through the medium of characters (also called avatars) who "live" within the game environment. Far from being a small niche market, the total number of current subscriptions to MMOGs as of July 2006 was thought to be approximately 15 million. Certain games have internal economies which generate substantial activity, and because the items and currency generated in-game can be sold for hard cash, the more popular games have sufficient economic activity to enable dedicated players to earn a living solely through the economic activity they generate in-game.

With the increasing value of virtual economies, issues arise with regard to taxation, legal rights, and the interaction between the virtual and real economies. It is understandably difficult for companies and interested individuals to participate in the economic activity occurring within virtual economies, although certain companies have begun to sponsor advertisements in social MMOGs such as "Second Life", and indeed the Reuters news agency has a full time reporter in the Second Life game world.

As this trend increases, companies which have traditionally been confined to the real world will face increasing challenges in trying to successfully integrate virtual world activity with their day-to-day operations. The present invention is directed to providing methods and systems to assist in this process.

DISCLOSURE OF THE INVENTION

The invention provides, in a first aspect, a method of operating a networked multiplayer game. This method includes the steps of:

a) providing to a player a controllable game character which the player may control to interact with the game's environment;

b) providing a mechanism as part of the game which can be operated by game characters to initiate a request for contact with a contact center agent;

c) upon operation of the mechanism by a character, issuing a request to a contact center which is separate from the game;

d) opening a communications channel between an agent or employee of the contact center and the game environment; and e) directing this communications channel to the locality of the player's character whereby the player and the contact center agent may communicate within the game environment.

According to this method, a game operator may provide enhanced experiences and opportunities to players of its games. By firstly enabling a request for contact with a contact center to be made within the context of a game, i.e. by employing an in-game mechanism, players are encouraged to stay within the game rather than being directed to visit an external website or to make a separate call or send an email to a contact center. Secondly, by enabling the agent to communicate with the player within the context of the game environment (at least from the player's point of view), the gaming experience is greatly enhanced and the player can remain "in character" throughout the interaction. In effect, the player perceives that the agent is "visiting" the game to respond to the player's request. A skilled agent may tailor the conversation to avoid this illusion being broken.

Preferably, there is also provided, in the game environment, a visual representation of an agent character and the communications channel is directed to the agent character.

In this way, the agent is "physically" embodied within the game in the sense that the player's character can now converse and interact with another character, that of the agent.

Preferably, the method also includes the step of animating the agent character in response to input from the agent.

Thus, the agent character can be enhanced to increase the realism by causing the character to apparently speak when a speech signal is detected from the agent. This can be automatically performed by equipment running the game or it can be performed by equipment at the contact center which augments the agent's communications with instructions for animating the agent character.

More preferably, the agent character is controlled by said agent.

The agent may control the character through a simple interface allowing the agent to enter simple commands to control the character, or the agent may be provided with a game client or game interface equivalent to that provided to players of the game, whereby the agent can fully control the agent character in the same way as the players control their own characters. Any such agent interface can of course be enhanced or simplified as appropriate to the situation.

Alternatively, the agent character can be automated.

The game engine can be provided with functionality to automate such agent characters. it is common within games to have non-player characters or NPCs which are controlled by the game and which can simulate the characteristics and actions of player-controlled characters. Such techniques can be used to augment the agent character with automated actions.

Another method of automation is where the agent's character is controlled/automated by the contact center server, by manipulating a game client interface or using other game control APIs (application programming interfaces) as may be available in the game. This mode is similar to when the agent controls the game character; the difference is that the agent's character is automated by the contact center. This may be used in conjunction with a live agent on the call, and for part of the time, it may be completely automated with no live agent participating, such as before the agent is allocated to the call.

A contact center providing a service or providing goods which are very much consistent with the game (e.g. a tailoring service for the clothes or a service for altering the appearance of characters e.g. a tattooing service) might benefit from employing well-trained agents having a full game client available to them. Other contact centers providing more limited services, e.g. in-game banking, might not need such functionality and might either automate their bank tellers and officials or might provide a "light" version of the client so that agents do not need the same degree of skill with the game mechanics to service contact requests.

Optionally, the method also includes the step of providing to the contact center information regarding the player making the request and/or regarding the player's character.

It will be appreciated that contact centers generally require information about the customer to properly service a call. In addition to the information which is strictly required to service a call, contact centers will often prompt the customer for additional information which helps to better service the contact. Often the information which might be most useful for an agent can be difficult to collect, such as a customer's spending habits, or the likelihood of a contact between a given customer and a contact center actually giving rise to a sale or transaction. Where a player has a history of interacting with businesses within a game, however, the game may log such interactions and can provide such information (subject to the customer's permission, if required, or the terms of service of the game) to a contact center to enhance the information available. The information can relate to the player of the game, and can include account information and history, time spent in game, history with other contact centers accessed in game, etc., or can relate to the character of the player such as the character's bank balance, details of the character's possessions, appearance and characteristics. Such additional information can greatly enhance the interaction between the agent and the player.

The method can also include the step, subsequent to the operation of the mechanism by the players s character, of placing the character in a simulation of a waiting environment.

This environment could be a simulation of a queue, for example, or of a waiting room, or of any other environment chosen to represent a waiting environment. To give a one example, if characters in the game are aircraft pilots (or indeed sentient aircraft), then the mechanism to request contact might be a radio frequency accessed to request a landing slot, and the waiting environment might be an aircraft holding pattern for a landing strip or airport.

Preferably the method further includes receiving from the contact center an indication of a wait time parameter at the contact center, and modifying said simulation of said waiting environment on the basis of said indication.

Thus, the length of the queue in which the contact sits, or the current average waiting time for contacts in that queue, or in the contact center generally, or any other wait time measurement, might be notified to the game and the game might modify the population of a waiting room, length of a queue or number of holding aircraft, based on this metric.

The invention also provides a system for use in a networked multiplayer game, the system including:
 a) a game engine providing to a player a controllable representation of a game character in a game environment whereby the player may control the character to interact with the environment;
 b) within the game environment, a mechanism operable by game characters to initiate a request for contact with a contact center agent;
 c) a request generator which, upon operation of the mechanism by a character of the player, issues a request to a contact center external to the game;
 d) a communications interface for providing a communications channel between an agent of the contact center and the game environment; and
 e) communications direction means for directing the communications channel to the game environment in the locality of the player's character whereby the player and the contact center agent may communicate within the game environment.

The invention further provides, in this aspect, a computer program product comprising instructions which when executed in a networked multiplayer game system are effective to:
 a) provide to a player a controllable representation of a game character in a game environment whereby the player may control the character to interact with the environment;
 b) provide, within the game environment, a mechanism operable by game characters to initiate a request for contact with a contact center agent;
 c) upon operation of the mechanism by a character of the player, issue a request to a contact center external to the game;
 d) open a communications channel between an agent of the contact center and the game environment; and
 e) direct the communications channel to the game environment in the locality of the player's character whereby the player and the contact center agent may communicate within the game environment.

It will be appreciated that such a computer program product can be distributed across different items of processing equipment associated with a game and need not be exclusively executed on a single game server. Typically, the program instructions will be distributed at least between the game engine and the communications server. The computer program product can be a physical carrier of a program on one or more media carriers such as hard drives, or optical or magnetic disks, or it can be embodied as an electrical signal or optical signal encoding the program instructions.

It should be noted that the agent may be unable to (and is not required to) differentiate between an MMOG-originating contact and a real world contact. One of the advantages provided by the invention is that it allows a contact center provider to offer existing contact center customers access to a new market without the need to retrain their agents. Agents may thus remain oblivious to the fact that a contact originated in a MMOG. However, there are advantages in some scenarios for having agents who are fully aware of the fact that a contact is a player of a networked online game, and this aspect of the invention, which has been alluded to previously, where the agent is aware of and may even participate in the game, will be described next in more detail.

In another aspect the invention provides a method of operating a contact center, including the steps of:
 a) receiving at the contact center a request for contact from a networked multiplayer game which is separate from the contact center;
 b) allocating the request to an agent of the contact center;
 c) providing to the agent a representation of the game environment so that the agent may see a representation of the character who was responsible for the request for contact which issued from the game; and d) opening a communications channel between the agent and the game environment In this aspect of the invention, the contact center provides an enhanced experience for the agent servicing requests received from players immersed in a game. While the agent need not be similarly immersed, it is extremely useful for such an agent to see a representation of the player's character so that the agent can provide a more realistic experience to the player who is immersed in the game. Thus an agent can note the character's appearance, demeanor, posture, actions and gestures, facial expressions, surroundings, and so on, and can employ such information usefully when interacting.

The method may also include the step of providing the agent with an interface enabling interaction with the representation of the environment of the game.

Preferably, the interface is a client program providing the agent with control of an agent character in the environment.

Thus, the agent can be provided with a full game client or a game client modified or enhanced for the agent, whereby the agent also controls a character within the game during the interaction between the agent and the player.

Further, preferably, the communications channel is directed to the agent character within the game environment.

In preferred embodiments, the method also includes the steps of providing to the agent a mechanism for interacting with a payment system of the game, and maintaining an account of payments involving the agent made using the payment system of the game, whereby financial transactions may be carried out between the player and the agent by employing the payment system of the game with such transactions recorded in the account.

The term "payment" as used herein is intended to denote transfers of currency having value in the real world, currency having value only within a game, transfers of bearer items such as cheques and credit notes written by a character in a game, and transfers of any other item of value such as artefacts created in game or forming part of a game (e.g. certain weapons and items of equipment within certain games will have defined or agreed values and can thus be used to effect barter-type payments).

This additional feature enables a contact center to capture some of the considerable wealth generated in game. While transactions can occur in either direction (e.g. a contact center might pay a player for completing a survey), the primary utility of this feature is that it provides a contact center agent with a way of obtaining payment in an alternative to the usual credit card type of transaction. Game systems will typically have payment mechanisms whereby one character can give money or other valuables to another character, and such mechanisms can be employed to allow the transfer of wealth or valuables between the player's character and the agent's character or a mechanism associated with the agent or the contact center (e.g. a deposit box). When such a transaction is completed an account will be updated and the contact center can thus give and receive valuable consideration for transactions agreed in game.

In some circumstances, as described above, the agent may not be aware of the contact's origins within an MMOG. Such agents may be provided with a payments interface which can map the in-game currency and other MMOG artefacts to real world values so that the transaction can be presented to the player in the terms of the game and can be presented to the agent in real world terms. In sufficiently sophisticated embodiments, each will be oblivious of the other person's view of the transaction, and automated "foreign exchanges2 can be used to convert sums between real currency and game currency. Obviously the applicability of such techniques would be dependent on the type of product/service being offered.

In this aspect there is also provided a contact center system, comprising;
  a) an interface with a networked multiplayer game external to the contact center for receiving requests for contact from the game;
  b) a contact allocation system for allocating a received request from the game to an agent of the contact center;
  c) an agent interface for providing to the agent a representation of the environment of the game whereby the agent may see a representation of a character responsible for the request from the game; and
  d) a communications system for providing a communications channel between the agent and the game environment There is further provided a computer program product comprising instructions which when executed in a contact center system are effective to cause the system to:
  a) await receipt at the contact center of a request for contact from a networked multiplayer game external to the contact center;
  b) allocate the request to an agent of the contact center;
  c) provide to the agent a representation of the environment of the game whereby the agent may see a representation of a character responsible for the request from the game; and
  d) open a communications channel between the agent and the game environment In another aspect the invention provides a method of enabling a transaction between a player of a networked multiplayer game and an agent of a contact center external to the game, comprising the steps of:
  a) opening a communications channel between the agent and a character of the player within an environment of the game;
  b) providing a payment mechanism within the environment of the game whereby the player may receive a payment from or issue a payment to the contact center agent; and
  c) upon operation of the payment mechanism, causing an account held by the player within the game to be credited or debited by an agreed amount.

The method can also include the step of:
  d) upon operation of the payment mechanism, causing an account held by the contact center within the game to be debited or credited by an agreed amount.

Alternatively, the method can include the further step of:
  d) upon operation of the payment mechanism, causing an account held by the contact center outside the game to be debited or credited by an agreed amount.

Thus, the contact center may be prepared either to receive or pay in-game credit or may prefer to receive or pay real currency held outside the game and converted at a market rate to in-game currency.

Preferably, said payment mechanism further comprises automatically converting a payment amount between a currency valid within the game and a currency valid in the real world.

Automatic foreign exchanges may be employed for the conversion of game money. This is to enable the agent (if the contact center administrator so chooses, and if the product/service of relevance lends itself to such) to be unaware that he/she is dealing with a contact from an MMOG.

There is further provided a payment system for enabling a transaction between a player of a networked multiplayer game and an agent of a contact center external to the game, comprising:

a) a communications channel between the agent and a character of the player within an environment of the game;

b) a payment mechanism provided within the environment of the game whereby the player may receive a payment from or issue a payment to the contact center agent; and     c) an account recording system which, upon operation of the payment mechanism, causes an account held by the player within the game to be credited or debited by an agreed amount.

There is also provided in this aspect a computer program product comprising instructions which when executed in a networked multiplayer game system enable a transaction between a player of the networked multiplayer game and an agent of a contact center external to the game, by causing the game system to:

a) ensure an open communications channel between the agent and a character of the player within an environment of the game;

b) provide a payment mechanism within the environment of the game whereby the player may receive a payment from or issue a payment to the contact center agent; and     c) upon operation of the payment mechanism, cause an account held by the player within the game to be credited or debited by an agreed amount.

DETAILED DESCRIPTION OF PREFERRED EMBODIMENTS

Figure 1:
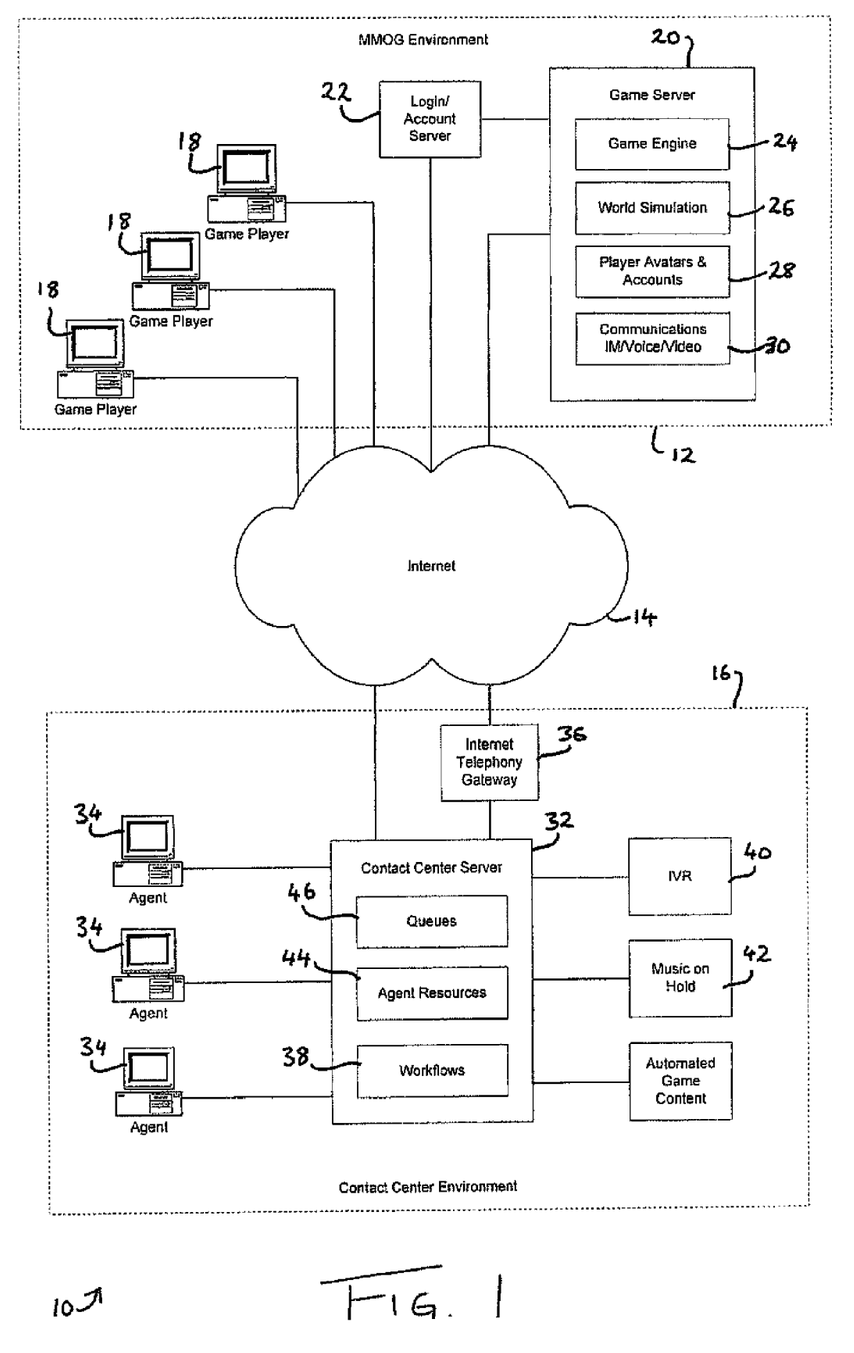
FIG. 1 is a schematic architecture of a network environment for one implementation of the present invention.

In FIG. 1 there is indicated, generally at 10, a network architecture comprising a massive multiplayer online game (MMOC) environment 12 running on the Internet 14, and a contact center environment 16 also connected to the Internet.

Within the MMOG environment 12, individual players 18 connect via the Internet to a game server 20 following an authentication process carried out by an associated login server 22 (the functions of login server 22 may of course also be carried out by game server 20). The game server 20, which is shown as a single server but will more often be implemented as a network of servers, executes a number of processes in order to host a game for the players 18, such processes typically including a game engine 24, a representation of the simulated world or game environment 26, representations and data relating to player characters or avatars 28 (which inhabit the world representation 26 and interact with it and with each other according to the rules of the game engine 24 and the actions of players), and communication functions shown generically at 30, such functions often including voice, video and instant messaging facilities whereby player characters may interact with one another, or players themselves may interact with one another in "out of game" communication channels which do not involve their characters.

The login server 22 is provided with player account information including the player's subscription and real world contact and billing details. In addition, if the game in question has an economy, the player's character(s) may also have separate accounts in the game currency, and in the illustrated embodiment, this character account information is stored with the character/avatar data 28 on game server 20. It will be appreciated that the player's account and the character's account need not be separate from one another and a unified account could be employed.

The contact center environment 16 is separate from the game and comprises a contact center server 32 which is connected to the Internet and to which a plurality of trained human contact center agents 34 are connected. Agents 34 may make and receive voice calls to external parties or customers. Such calls may be carried over the public switched telephone network (PSTN), not shown, or may be carried over the Internet with which the contact center server connects via an Internet telephony gateway 36. The contact center may additionally be enabled with technology such as the session initiation protocol (SIP), allowing communications to be made in a range of media types. In addition to voice calls, agents may communicate with customers using video, or using data media such as instant messaging or email.

Incoming communications (known as contacts) are managed by the contact center server 32 in order to route contacts to agents in the most efficient manner for the contact center's purposes. The management of contacts is controlled by workflows 38 which determine the routing of contacts through automated treatments such as an interactive voice response (IVR) application 40 or a music-on-hold server 42. The IVR application provides information useful for classifying a contact in order to best route it to an available and competent agent. Other information gleaned from the source of the contact, the number called, etc. can also be used in this way.

Each contact can therefore be allocated to one or more skillsets which are serviced by the agents 34 according to skillset abilities noted for each agent in a set of agent resource records 44. At busy times, the contacts are placed in queues according to skillset and the contact center server also therefore manages the set of queues 46. In this way, all incoming calls are classified and directed to agents according to the treatment specified in the workflows. The system as described thus far is conventional and known in the art.

Figure 2:
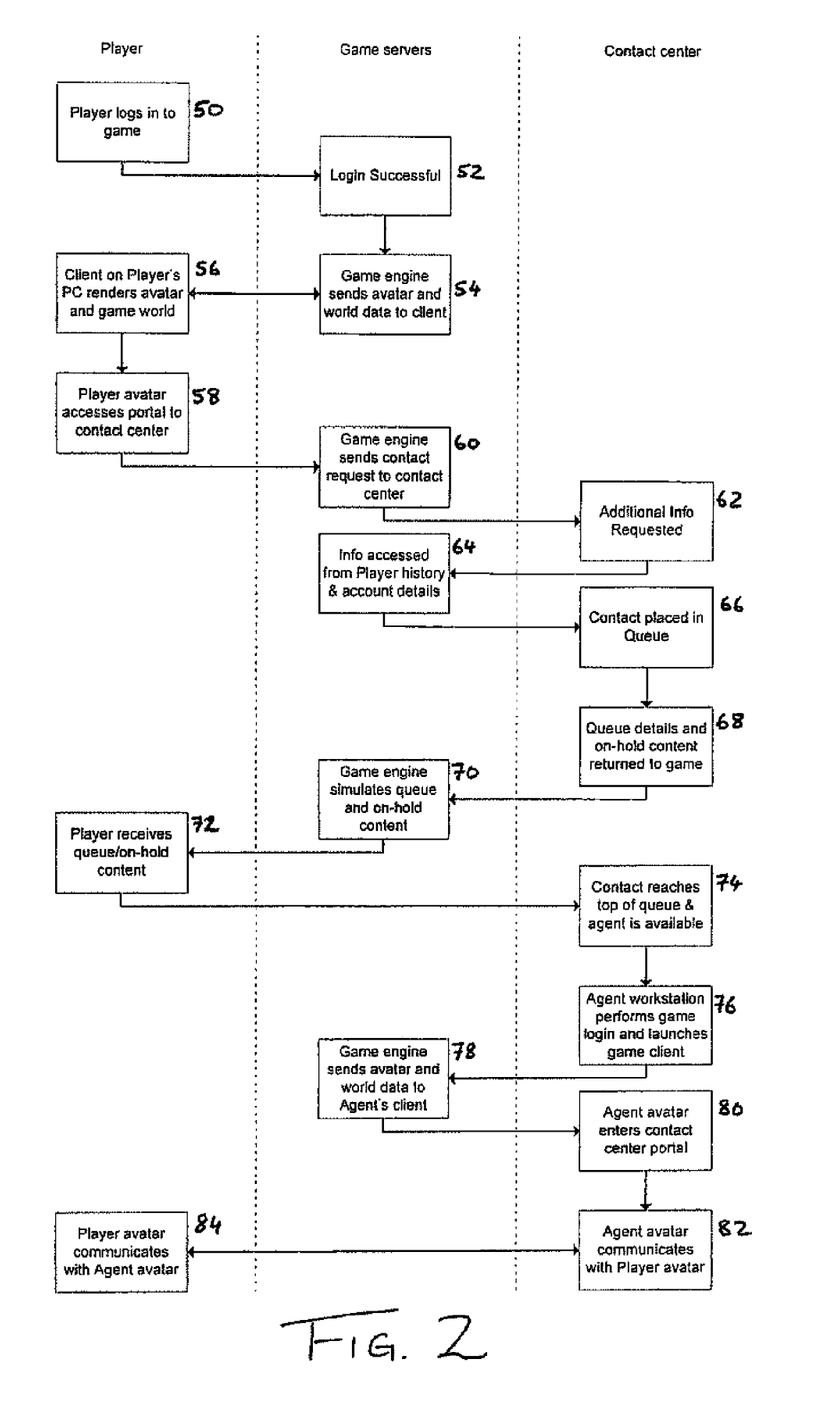
FIG. 2 is a flowchart illustrating a method of operating a game and a contact center in accordance with the present invention.

Referring additionally to FIG. 2, a flowchart is shown detailing a sequence of steps carried out by a player 18 (left hand column of flowchart), the game server and login server 20,22 (center column of flowchart), and the contact center 16 (right hand side of flowchart).

The process begins when a player logs into the game, step 50, and following a successful login on the login account server 22, step 52, the game engine 24 sends the player's avatar data and the world simulation data for the avatar's environment to a game client resident on the player's machine, step 54.

The client program running on the player's machine renders the game world and the avatar within the game world to the player, step 56, and the player can control this avatar in order to play the game as normal.

Within the game world provided according to the present invention, a mechanism has been provided for access to the services of contact center 16. There may be any number of reasons why a player might want to access services which might be provided by a contact center, and the mechanism used to access the contact center can be any mechanism which a player avatar could normally access within the game. Thus it could be a doorway or an arch through which the avatar moves, or a lever or a button, or a textual, menu or clickable command available through the client program. The mechanism might be labelled with "real world" information relating to the contact center, or the mechanism can appear to be entirely within the terms of reference of the game world, i.e. without any real world references.

Assuming that there is a portal or doorway provided in this particular game, the player avatar accesses this portal to initiate communication with the contact center, step 58. The game engine recognises this action as a command to send a contact request to a contact center associated with that portal mechanism, step 60. A communications link is created or accessed over the Internet between the game and the contact center, i.e. the game server is programmed to formulate requests to a network address associated with the contact center. The request will typically include an identifier of the player, but may include additional details of the request, such as details entered by the player when accessing the mechanism in step 58. Thus, a player might write a letter or note, or record a voice message when accessing the mechanism, and any such details would be passed along with the request to the contact center in step 60.

In step 62, the contact center, upon receiving a request for contact initiation, may request additional information to assist in queuing and directing the contact. Such additional information might already be available to the game server from, for example, the login/account server 22. Other sources of data can also be used, such as the player history (how often the player has requested similar services, details of the player's in-game bank balance, details of previous services purchased or requested by the player, etc.), step 64. When this information is returned to the contact center, a contact is placed in a queue, step 66.

The contact center then returns details of the successful queuing of the contact and returns on-hold content to the game, step 68. This on-hold content can be interactive voice response treatments, music on hold, or automated game content such as an automated character who appears to the player and asks questions analogous to those which would typically have been provided in an interactive voice response environment in a telephone call. The automated game content is supplied by a module 48 within the contact center environment 16.

When these details are returned to the game in step 68, the game engine optionally simulates a queue and passes on the on-hold content in step 70. Thus, using the example of a series of question which are to be asked by the contact center, the game engine may in fact generate an automated character which is made to speak those question to the player's avatar. In step 72 the player receives any queue content or any on-hold content and optionally, an interactive session may follow in which the player's interaction with this content is processed by the game and/or the contact center to improve the queuing details or to add to the player's data stored by the game and/or the contact center. A representation of the queue might be generated for the player, so that the player sees a line of other characters ahead of his own character, which reduces as the player's contact approaches the top of the queue maintained by the contact center.

Another example is a representation of a waiting room, as at a doctor's office. This environment allows for non-sequential/out-of-sequence processing of contacts (such as when a nurse calls out the name of the next patient to be seen, which is not always the person waiting the longest).

As with traditional contacts in contact centers, the contact sooner or later reaches the top of a queue for which an agent is available, step 74. The agent workstation is provided with a client program which performs a game login and launches the game client, step 76. If the agent deals exclusively with contacts from one particular game, then the agent can be logged in permanently. Alternatively, the agent may be servicing contacts from other channels as well as from the game, in which case it is more likely that the agent's game client will log in to the game only when responding to such contacts.

In step 78, the game engine, following the agent's login, sends avatar and world data to the agent's client program, step 78. The agent avatar then enters the contact center portal where the player's avatar is situated, step 80. In steps 82 and 84, the agent avatar communicates with the player avatar and vice versa. The player is thus provided, in game, with an experience of dealing with an agent which is to all intents and purposes part of the game and does not require him or her to "break character". From the point of view of the contact center, skilled agents can provide an enhanced experience to their customers which is not provided when a player has to log out of the game or take his or her attention away from the game in order to dial a contact center number or access a website.

Figure 3:
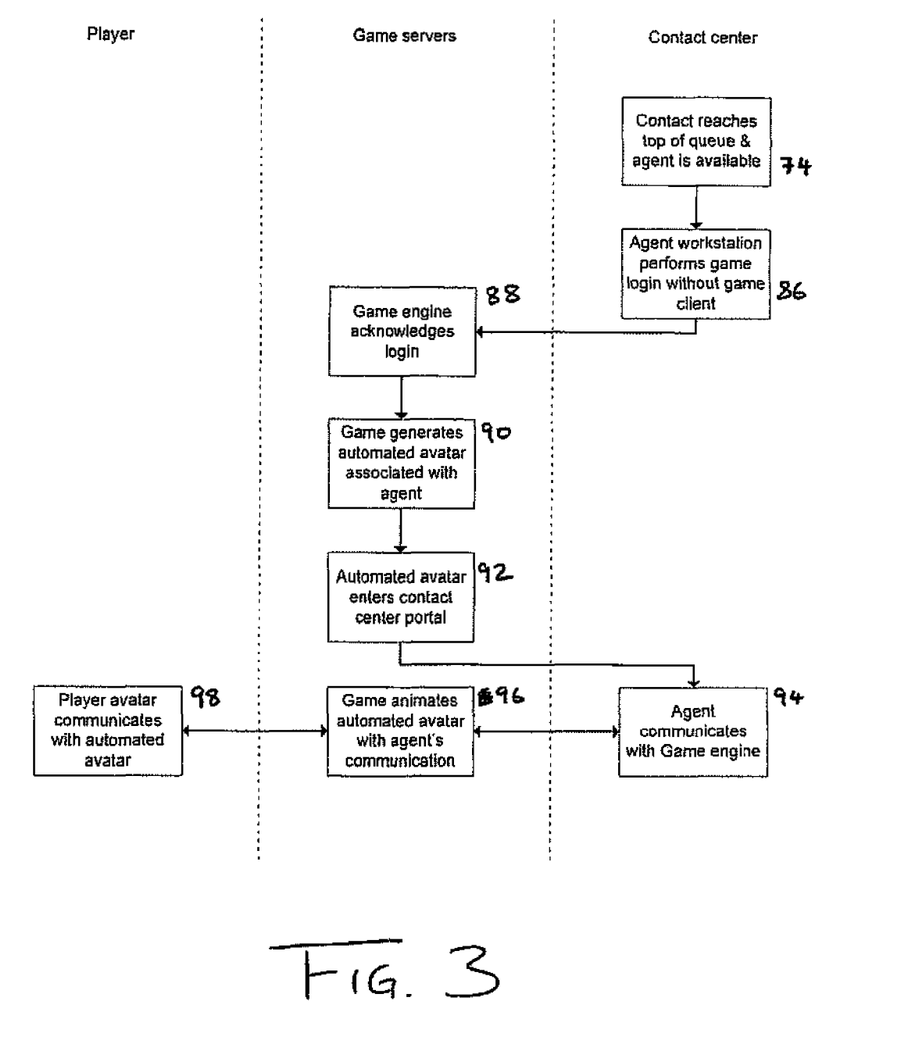
FIG. 3 is a flowchart illustrating a variation on the method of FIG. 2.

FIG. 3 illustrates a variation on this process, beginning at step 74, when the contact reaches the top of the queue and an agent becomes available. Whereas the process of FIG. 2 was immersive for the agent as well as for the player, the process of FIG. 3 is not immersive for the agent, i.e. the agent does not have a full game client on his or her workstation.

In step 86 of FIG. 3, the agent workstation performs a game login without a game client being presented to the agent. The game engine acknowledges this login in step 88, and then the game itself generates an automated avatar in step 90 which is associated with that agent login. In step 92, the automated avatar generated by the game enters the contact center portal (i.e. it appears there to the player) and from this point on the player avatar can communicate with this automated avatar, i.e. the player will see and can speak to the automated avatar in the contact center portal.

Form the agent's point of view, the agent communicates with the game engine, in step 94, such that any communications from the agent or to the agent using the normal communications equipment employed by that agent, are channelled to the game engine. The game engine intercepts such communications and uses them, step 96, to automate the avatar with the agent's communication. Such automation can be as simple or as sophisticated as the game engine permits. Thus, the voice of the agent can be augmented by physical gestures, emotions, and so on. Alternatively, a video image of the agent can be converted to or merged with the avatar's appearance and actions.

In step 98, it can be seen that the player avatar communicates with the automated avatar, and thus communication proceeds between the player and the agent with the game engine acting as an intermediary controlling the agent's avatar.

Figure 4:
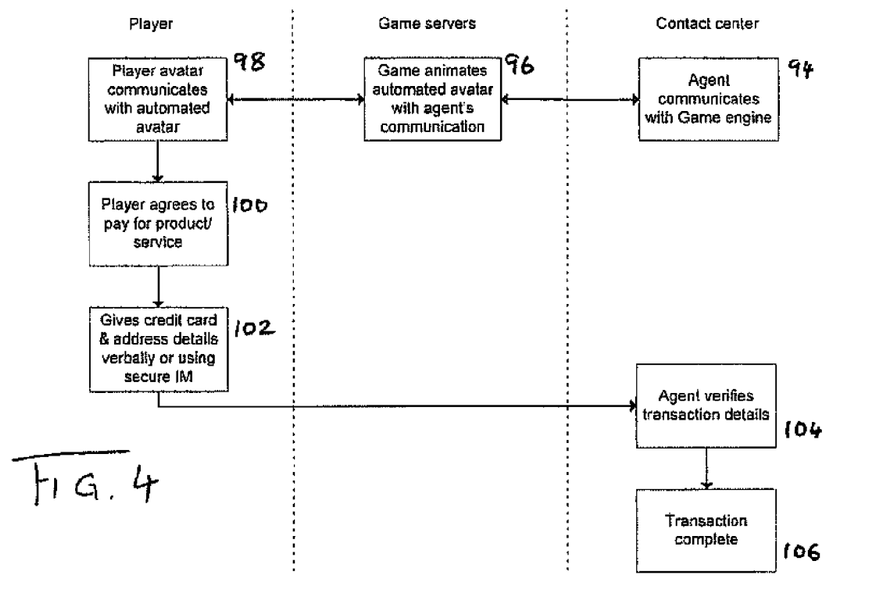
FIG. 4 is a flowchart illustrating a first method of completing a financial transaction.

FIG. 4 shows an example of a transaction carried out once communications have been established according to FIG. 3. The same principles apply, however, to the process of FIG. 2. In steps 94, 96 and 98, the agent, game and player communicate with one another as described above. When it is agreed between the player and agent that the player will pay for a product or service, step 100, the player provides credit card or other payment details and address details or other authentication details verbally or using secure instant messaging, step 102. These details are communicated either through the game server or via a different communications channel set up specifically for the transaction, and the agent verifies the transaction details as an agent would in a communications session in a contact center which had been initiated using more conventional channels, step 104. Once the agent is satisfied as to the financial details of the transaction and as to any agreed delivery of products or services, the transaction is completed, step 106.

It will be appreciated that the process of FIG. 4 is essentially a conventional transaction piggybacked onto a contact center session carried out through the medium of a game according to the invention. However, FIG. 5 describes a further integration between the contact center and the game.

Figure 5:
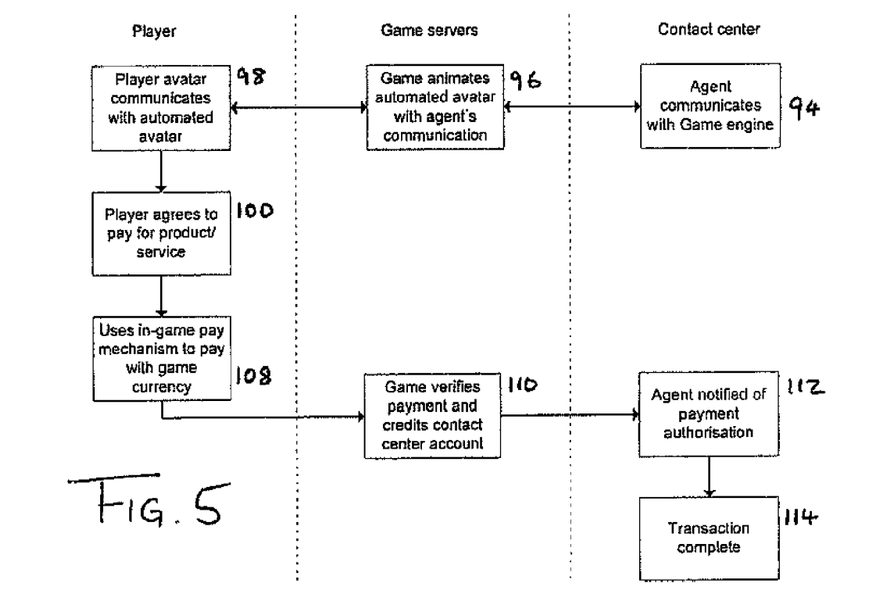
FIG. 5 is a flowchart illustrating a second method of completing a financial transaction.

In the process of FIG. 5, steps 94, 96, 98 and 100 are as described above, with the player agreeing to pay for a product or service. However, rather than employing real-world payment mechanisms, the player in this case uses an in-game payment mechanism to pay for a product or service (which may be a real world product or service) with game currency, step 108. The game verifies that the player is in a position to make such a payment according to the game rules, and performs a financial transaction deducting the credit from the player's account, optionally taking a commission from the transaction, and crediting a contact center account held on the game server or held in the real world.

For games where there is an open exchange mechanism converting between in-game currency and real world currency (such as for the MMOG called "Second Life" where the in-game currency of "Linden dollars" are freely exchangeable on various websites to U.S. dollars), the contact center may choose to be paid in real world currency rather than in in-game currency. However, it may also suit the contact center to maintain an in-game account balance.

Once this transaction has been completed according to the game server's records, the agent is notified by the payment authorisation, step 112, and the transaction then completes with the agreement of both player and agent, step 114.

The invention is not limited to the embodiment(s) described herein but can be amended or modified without departing from the scope of the present invention.

What is claimed is:

1. A method of operating a game server hosting a networked multiplayer game comprising the steps of:
    a) hosting a networked multiplayer game on said game server, said game server operating a game engine providing to a player a controllable representation of a game character in a game environment whereby said player may control said controllable representation of a game character to interact with said game environment;
    b) providing, within said game environment of said networked multiplayer game hosted on said game server, a mechanism operable by controllable representations of game characters to initiate a request for contact with a contact center agent;
    c) upon operation of said mechanism by said controllable representation of a game character of said player, issuing a request to a contact center external to said game;
    d) subsequent to the operation of the mechanism by said controllable representation of a game character, modifying the game environment experienced by said controllable representation of a game character to simulate a waiting environment;
    e) receiving from the contact center an indication of a wait time parameter at the contact center;
    f) modifying said simulation of said waiting environment on the basis of said indication of a wait time parameter during a period while the player is awaiting being placed in communication with an agent of said contact center;
    g) opening a communications channel between the agent of said contact center and said game environment;
    h) directing said communications channel to the game environment in a locality of said controllable representation of a game character whereby said player and said contact center agent may communicate within the game environment; and
    i) providing, in the game environment, a visual representation of an agent character and directing said communications channel to said agent character, wherein said agent character is controlled by said agent.

2. A method as claimed in claim 1, further comprising the step of animating said agent character in response to input from said agent.

3. A method as claimed in claim 1, wherein said agent character is automated.

4. A method as claimed in claim 1, further comprising the step of providing to the contact center information regarding the player making the request and/or the player's character.

5. A system for use in a networked multiplayer game comprising:
    a) a game server operating a game engine, said game engine providing to a player a controllable representation of a game character in a game environment whereby said player may control said controllable representation of a game character to interact with said game environment;
    b) within said game environment, a mechanism operable by controllable representations of game characters to initiate a request for contact with a contact center agent;
    c) a request generator which, upon operation of said mechanism by said controllable representation of a game character of said player, issues a request to a contact center external to said game;
    d) a waiting environment accessible to said game engine, whereby subsequent to the operation of said mechanism by said controllable representation of a game character, the game environment experienced by said controllable representation of a game character is modified to simulate said waiting environment and, upon receiving from the contact center an indication of a wait time parameter at the contact center, said simulation of said waiting environment is modified on the basis of said indication of a wait time parameter while the player is awaiting being placed in communication with an agent of said contact center;
    e) a communications interface for providing a communications channel between an agent of said contact center and said game environment; and
    f) communications direction means for directing said communications channel to the game environment in a locality of said controllable representation of a game character whereby said player and said contact center agent may communicate within the game environment; and
    g) means for providing, in the game environment, a visual representation of an agent character and directing said communications channel to said agent character, wherein said agent character is controlled by said agent.

6. A non-transitory computer readable medium comprising instructions which when executed in a networked multiplayer game system are effective to:
    a) provide to a player a controllable representation of a game character in a game environment whereby said controllable representation of a game player may control said character to interact with said game environment;

b) provide, within said game environment, a mechanism operable by controllable representations of game characters to initiate a request for contact with a contact center agent;
c) upon operation of said mechanism by said controllable representation of a game character of said player, issue a request to a contact center external to said game;
d) subsequent to the operation of the mechanism by said controllable representation of a game character, modifying the game environment experienced by said controllable representation of a game character to simulate a waiting environment;
e) receiving from the contact center an indication of a wait time parameter at the contact center;
f) modifying said simulation of said waiting environment on the basis of said indication of a wait time parameter while the player is awaiting being placed in communication with an agent of said contact center;
g) open a communications channel between an agent of said contact center and said game environment;
h) direct said communications channel to the game environment in a locality of said controllable representation of a game character whereby said player and said contact center agent may communicate within the game environment; and
i) provide, in the game environment, a visual representation of an agent character and direct said communications channel to said agent character, wherein said agent character is controlled by said agent.

* * * * *